March 5, 1940.  E. F. RENDELL  2,192,841
ROTOR CONSTRUCTION FOR SQUIRREL CAGE INDUCTION MOTORS
Filed April 5, 1938
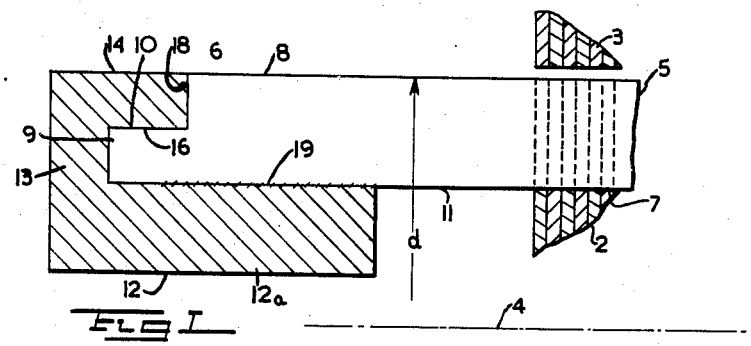
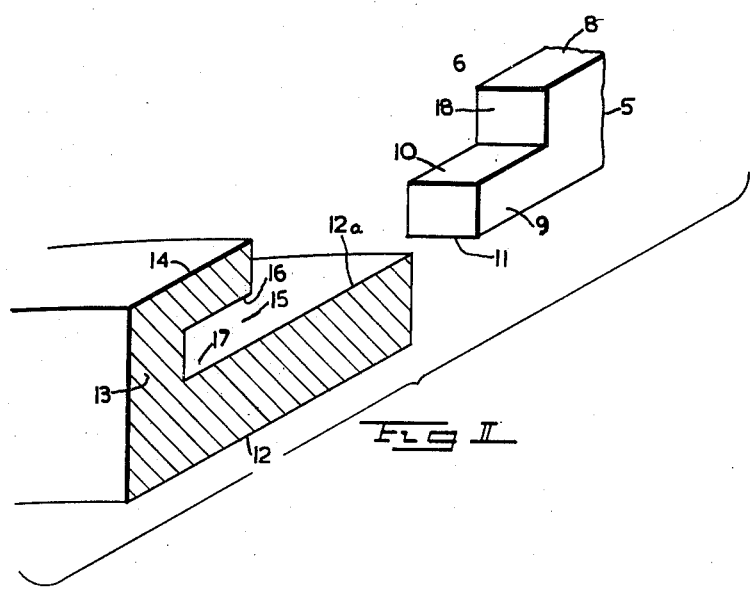

Patented Mar. 5, 1940

2,192,841

UNITED STATES PATENT OFFICE 2,192,841

ROTOR CONSTRUCTION FOR SQUIRREL CAGE INDUCTION MOTORS

Edward Frank Rendell, Johannesburg, Transvaal, Union of South Africa

Application April 5, 1938, Serial No. 200,259

2 Claims. (Cl. 172—120)

This invention relates to the rotors of squirrel cage induction motors, comprising bars seated in longitudinal slots in the rotor core and projecting beyond the core at each end, and short circuiting rings to which said projecting ends of the bars are connected.

In the commonly used connection between the bar ends and the short-circuiting rings, the bar ends are seated on the outer peripheral surfaces 10 of the rings and are brazed thereto. The brazing is relied upon to provide both the electrical connection and the mechanical connection between the bars and the rings; but in practice is found not to be entirely satisfactory for the latter pur15 pose.

It is the object of the present invention to provide a cage assembly which, whilst maintaining effective electrical connection between the bars and the rings, provides a satisfactory mechanical connection and complies with the conditions entailed by the following considerations.

It is desirable that the bars should be completely shaped before assembly, so that for instance they do not require to be bent after being positioned in the rotor slots. Moreover it is desirable that the bars can be pushed into, and withdrawn from, the rotor slots from the ends thereof by movement parallel with the axis of the rotor and that accordingly they should be straight in the sense that the projecting ends of each bar, or at least the projecting end which is pushed through the slot in assembling the bars in the rotor is, in end view of the bar, wholly within the cross section of the body portion of the bar which seats in the slots.

In order that the assembled rotor may be passed by axial movement into its position within the stator, whilst maintaining the air gap between the rotor and the stator at the minimum rendered possible by other considerations, it is necessary that the short-circuiting rings, or at least one of them, should not be of greater diameter than the overall diameter of the rotor bar assembly.

A squirrel cage rotor, according to the invention, comprises the combination with straight rotor bars, of a short-circuiting ring of not greater diameter than the overall diameter of bar assembly and providing bearing surfacing directed inward to the rotor axis, the adjacent end of each bar being so reduced in thickness as to provide a bearing surface below the level of the outer bar face and directed away from the rotor axis, the bar bearing surfaces contacting with the bearing surfacing of the ring, the bars and the ring being electrically connected.

The ring is preferably of solid metal and may be of channel section at least where each bar connects to it, with the flanges of such section parallel with the axis of the rotor and directed towards the rotor core. The bar ends are cut down from their outer faces to form tongues which fit tightly between the flanges. The electrical conducting joint between each bar and the ring is preferably made by fused metal; and this kind of joint completes the mechanical joint by securing the bar and the ring against relative axial movement.

An example of the invention is shown in the accompanying drawing in which:

Figure I is a longitudinal section of a portion of a squirrel cage motor.

Figure II is a perspective view showing details.

In the drawing 2 indicates the rotor core and 3 the stator. 4 indicates the axis of the rotor, not at its true distance from said parts. 5 indicates any one of the rotor bars, which are quadrilateral in section and are straight lengthwise and are pushed endwise with their ends 6 foremost, into their slots, one of which is indicated by 7.

The end of the bar is cut down from its outer face 8 to provide the tongue 9 of which the radially outer surface 10 is at a lower level, radially, than said face 8. The inner face 11 of the bar is preferably unaltered.

The short-circuiting ring is of continuous channel section comprising the radial web 13 and the two flanges 12 and 14 both of which are directed parallel with the axis 4 and inward towards the stator core. Said flanges provide between them the annular groove 15, the annular surface 16 of which provides the aforesaid annular surfacing directed inward to the axis 4. The tongue 9 enters and is a fairly tight fit in said groove 15, so bringing the pairs of surfaces 10, 16 and 11, 17 into firm contact, and thereby securing the bar and ring positively against relative radial displacement. The radial thickness of the flange 14 is equal to that of the shoulder 18 of the bar so that the ring is not of greater diameter than the overall diameter $d$ of the bar assembly.

The radially inner flange 12 is of greater length than the outer flange 14 so that a portion $12a$ while forming a portion of the seating for the bar face 11, is not overhung by the flange 14, and is thus readily accessible for making the brazed joint 19 between itself and the bar. Said brazed joint forms the electrical connection between the ring and the bar and can be made of the necessary area to avoid heating by suitably adjusting the length of the flange portion 12a.

The brazed joint also serves the purpose of completing the mechanical joint by securing the bar and ring against relative axial movement. It will be seen that the mechanical joint substantially relieves the brazed joint of mechanical stresses due to centrifugal force.

I claim:

1. A squirrel cage rotor comprising, straight rotor bars and a short-circuiting ring the maximum diameter of which is at most equal to the overall diameter of the bar assembly, the cross-section of the short-circuiting ring adjacent the end of a bar having a radial web and two flanges parallel with the rotor axis, the radially outer flange being of shorter length than the radially inner flange and leaving a substantial portion of said inner flange exposed for making an electrical connection between said bars and said ring, the end of each bar being reduced to form a tongue which fits between said flanges, and said bars being fused to that portion of the inner flange which projects beyond the outer flange.

2. A squirrel cage rotor comprising, straight rotor bars and a short-circuiting ring having a maximum diameter which is at most equal to the overall diameter of the bar assembly, the cross-section of the short-circuiting ring being channel-shaped with spaced flanges directed towards the rotor core, the radially outer flange being of shorter length than the radially inner flange and leaving a substantial portion of said inner flange exposed for making an electrical connection between said bars and said ring, the end of each bar being reduced to form a tongue which fits between the said flanges, and radially inner surfaces of said bars being electrically united with portions of said inner flange which project beyond the end of the outer flange.

EDWARD FRANK RENDELL.